(12) United States Patent
Barritz et al.

(10) Patent No.: US 10,049,192 B2
(45) Date of Patent: Aug. 14, 2018

(54) SOFTWARE PRODUCT INVENTORY AND USAGE INFORMATION CORRELATED WITH LICENSE AGREEMENT INFORMATION

(75) Inventors: Robert Barritz, New York, NY (US); Peter Kassan, New York, NY (US); Per Hellberg, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1102 days.

(21) Appl. No.: 13/096,422

(22) Filed: Apr. 28, 2011

(65) Prior Publication Data
US 2011/0238710 A1 Sep. 29, 2011

Related U.S. Application Data

(63) Continuation of application No. 09/518,048, filed on Mar. 2, 2000, now abandoned.

(60) Provisional application No. 60/123,531, filed on Mar. 5, 1999.

(51) Int. Cl.
*G06F 17/30* (2006.01)
*G06F 21/10* (2013.01)

(52) U.S. Cl.
CPC ............................. *G06F 21/105* (2013.01)

(58) Field of Classification Search
CPC .................................................. G06F 21/105
USPC ..................................... 707/802, 803, 804
See application file for complete search history.

(56) References Cited

U.S. PATENT DOCUMENTS

| | | | |
|---|---|---|---|
| 5,202,977 A | 4/1993 | Pasetes, Jr. et al. |
| 5,515,524 A | 5/1996 | Lynch et al. |
| 5,579,222 A | 11/1996 | Bains et al. |
| 5,590,056 A | 12/1996 | Barritz |
| 5,668,995 A | 9/1997 | Kabekode |
| 5,745,879 A | 4/1998 | Wyman |
| 5,758,069 A | 5/1998 | Olsen |
| 5,765,152 A | 6/1998 | Erickson |
| 5,796,941 A | 8/1998 | Lita |

(Continued)

FOREIGN PATENT DOCUMENTS

| | | |
|---|---|---|
| EP | 0852349 A2 | 7/1998 |
| WO | WO 97/37316 | 10/1997 |

OTHER PUBLICATIONS

U.S. Appl. No. 09/518,048.

(Continued)

*Primary Examiner* — Heather Herndon
*Assistant Examiner* — Merilyn Nguyen
(74) *Attorney, Agent, or Firm* — Stephen R. Tkacs; Stephen J. Walder, Jr.; Richard A. Wilhelm

(57) ABSTRACT

A software tool and database that enables a user to view information, on the one hand, pertaining to hardware and software product inventory and usage, and, on the other hand, to license agreement information in such way that the two sets of information are correlated and associated. The tool presents inventory and usage information based on agreement criteria and/or agreement information based on inventory and usage criteria in an integrated fashion that permits the user to switch from one kind of information to the other kind in a variety of convenient ways. The main functional blocks of the software tool include a data acquisition tool, a reconciliation and association tool, and a processing/display/output tool.

22 Claims, 6 Drawing Sheets

(56) References Cited

U.S. PATENT DOCUMENTS

| | | | |
|---|---|---|---|
| 5,825,883 A | 10/1998 | Archibald et al. | |
| 5,825,893 A * | 10/1998 | Kara | 380/51 |
| 5,867,714 A | 2/1999 | Todd et al. | |
| 5,930,764 A | 7/1999 | Melchione et al. | |
| 5,940,504 A | 8/1999 | Griswold | |
| 5,974,572 A | 10/1999 | Weinberg et al. | |
| 6,021,492 A | 2/2000 | May | |
| 6,029,145 A | 2/2000 | Barritz et al. | |
| 6,049,799 A * | 4/2000 | Mangat et al. | |
| 6,105,069 A * | 8/2000 | Franklin et al. | 709/229 |
| 6,189,146 B1 * | 2/2001 | Misra | G06F 21/105 |
| | | | 705/59 |
| 6,366,951 B1 * | 4/2002 | Schmidt | H04L 67/10 |
| | | | 709/208 |
| 6,735,701 B1 * | 5/2004 | Jacobson | 726/1 |
| 7,225,137 B1 * | 5/2007 | Barritz | 705/348 |
| 7,870,399 B2 * | 1/2011 | Bryant | G06F 21/54 |
| | | | 713/190 |
| 2005/0102240 A1 * | 5/2005 | Misra | G06Q 30/06 |
| | | | 705/59 |
| 2006/0178918 A1 * | 8/2006 | Mikurak | 705/7 |
| 2008/0201211 A1 * | 8/2008 | Frank et al. | 705/10 |
| 2009/0083109 A1 * | 3/2009 | Frank | G06Q 10/0631 |
| | | | 705/310 |

OTHER PUBLICATIONS

PCT International Search Report for Application No. PCT/US 00/05664 dated Jul. 12, 2000, 7 pages.

"ContractManagement Tracking Software User Guide", http://www.gbcworld.com/userguide.html, printed Feb. 9, 2000, 12 pages.

"Maximizing Performance/Availability for Running Applications", IBM Technical Disclosure Bulletin, vol. 34, No. 5, Oct. 1, 1991, 2 pages.

"The Contract Tickler", Version 2.0, http://www.arm-group.com/ctwin.html, printed Feb. 9, 2000, 4 pages.

"Total IT Asset Ownership Management", http://www.janus-tech.com/Products/Argis99.html, printed Feb. 9, 2000, 24 pages.

Elmasri et al. "Fundamentals of Database Design", Chap. 19, 1989, pp. 544-545.

Grummitt, Adam, "Automating enterprise performance management", Capacity Management Review, Demand Technology, Inc., vol. 26, No. 3, Mar. 1998, pp. 1, 3-11 and 14-15.

Shoop, Kathy K. et al., "Janus Technologies Announces Release of ArgisBudget; New Product Streamlines and Simplifies IT Budgeting", http://www.janus-tech.com/Asset_Mgmt/3-14-00argisbudget.html, printed May 16, 2000, 36 pages.

Sia, Choon-Ling et al., "Predictive capacity planning: a proactive approach", Information and Software Technology, vol. 39, No. 3, Elsevier, Netherlands, Mar. 1997, pp. 195-204.

* cited by examiner

SOFTWARE PRODUCT INVENTORY AND USAGE INFORMATION CORRELATED WITH LICENSE AGREEMENT INFORMATION

RELATED APPLICATION

This Application is a continuation of U.S. application Ser. No. 09/518,048 filed Mar. 2, 2000, status pending, which claims priority and is entitled to the filing date of U.S. Provisional Application Ser. No. 60/123,531 filed Mar. 5, 1999, and entitled "METHOD AND PROCESS FOR DISPLAYING SOFTWARE PRODUCT INVENTORY AND USAGE INFORMATION CORRELATED WITH LICENSE AGREEMENT INFORMATION".

BACKGROUND OF THE INVENTION

The present invention relates to Software and Hardware Inventory and Usage and more particularly to a method and process for displaying software product inventory and usage information correlated with license agreement information.

The invention builds upon the disclosure in the present assignees U.S. Pat. No. 5,499,340, the contents of which are incorporated by reference herein.

A variety of techniques are available for gathering and reporting on the inventory and usage of software products and the hardware (computers) that they are installed and execute upon.

In some environments (e.g., PC networks), software tools are available that conduct a survey to discover the computers and related hardware devices. Some of these same tools, as well as other products that do not do such a hardware survey, also survey the executable software programs ("modules," "executable files") on a computer or a network of computers and then automatically identify (on the basis of a knowledge base of file names, identifying strings, "footprints," etc.) which software products they comprise.

Yet other tools allow users to specify products that users are installing or have installed, implicitly or explicitly indicating which programs they comprise. In addition, some of these tools identify the particular versions and/or releases found as well as what product suites each one belongs to. Such inventory information is often enhanced to include identification of the particular processor on which each product is installed, its physical location (by country, region, state, county, city, building, etc.) and organizational subdivisions (such as company, division, and department) with which the processor, the product, or the particular installation of the product is associated. Thereafter, such inventory information can be treated on a consolidated basis, with the ability to select and manipulate on the basis of such enhanced identification.

Using such a tool (or other such tools), the usage or execution of such software products (which have been automatically identified or manually specified by the user upon installation or at a later time) can be monitored. A variety of techniques are available to monitor the usage of other programs, including: intercepting the operating system component that manages or initiates program execution; making use of interfaces provided by the operating system for such purposes; "wrapping" or "prefacing" program modules with code to invoke or perform the monitoring functions; intercepting operating system logging activity; reading operating system logs after the fact; and other such techniques. A number of other tools are available that monitor such module usage without themselves relating modules to product identity.

Thereafter, a variety of product inventory and usage information can be displayed, printed, exported, etc. For example:
Installed products by processor and library
Installed products by vendor
Libraries by installed product, upon which each product is installed,
Product usage by product
Product usage by product and library
Product usage by user and product
Product usage by user, product, processor, and library
License Agreements Other software tools exist that allow users to enter into a database information pertaining to contractual license agreements ("contracts," "agreements") for the user's software products.

This provides a convenient place to record such information as vendor or distributor, contact information, software and/or hardware products covered by the agreement, computers on which the software is authorized to run, number of authorized users, maintenance terms, renewal date, budgets and forecasts, invoice and payment history, key terms and conditions, links to electronic versions of documents, etc.

As license agreements are often interrelated in complex ways, such tools typically allow the user to organize and identify these agreements in terms of master agreements, sub-agreements, addenda, etc. Some such products also provide: automated "alerts" (signals that an important event is occurring); financial capabilities such as chargebacks, links to accounting systems, etc.; information about vendor Internet address (allowing the user to automatically open a browser and display information from the vendor's Web site); and other capabilities.

Existing software tools which offer asset management capabilities include ARGIS from Janus Technologies, The Contract Tickler from ARM Group and ContractManagement from Global Business Center. These existing products are not believed to provide linked associations of data from pre-existing repositories and many-to-many linkages. Nor do they provide reconciliation of data from multiple repositories in an automatic or substantially automatic fashion.

The Problem

Although both kinds of information—inventory and usage information on the one hand and agreement information on the other—are useful by themselves, they would be more meaningful and useful if they were integrated, related, coordinated, and reconciled.

For example, when the time comes to decide whether to renew a maintenance contract for a particular product from a particular vendor, it is highly desirable to be able to look at installation and usage information about that product. As another example, when looking at the usage patterns for a particular product, it is highly desirable to be able to look at the license agreement or agreements that pertain to it, for opportunities to save money by canceling a product or consolidating its usage onto fewer processors.

However, at present, using existing tools, it is awkward to relate the two types of information. The user must look up the contract in the license agreement tool and then manually lookup the corresponding inventory and usage information in the other tool (or vice versa).

With a single installation having hundreds of agreements, thousands of software products, and possibly tens of thousands of computers and users, this process can be laborious, repetitive, error-prone, expensive, and impractical. Time is often critical—if the information cannot be obtained and evaluated before a particular date (e.g., a deadline for canceling or renegotiating a contract), it is essentially useless.

The inability to cope with an unlimited quantity of such data in a reliable, timely and cost-effective way makes it impractical to perform such analysis and correlation for all vendors and all products on a regular basis—only those few occasions where the costs are high enough and the number of data items small enough to make it cost-justifiable.

Another problem in going back and forth between two unintegrated tools is the difficulty arising when reconciling items (such as a product, vendor, processor, user, etc.) named or treated differently in the two tools. Although the user can, of course, make a decision, for example, as to which product in one tool corresponds to which product in the other, each user must make such a decision on a case-by-case basis, and there is no convenient way to create an automatic linkage. This means that, for example, the next time the user pulls up the same information pertaining to a particular license agreement for a particular product, he or she will have to repeat the same process. Furthermore, other users of the same tools will each individually have to repeat the same process, possibly making different decisions.

Some tools may provide the ability to create multiple views ("windows"). The operating system itself may provide the capability to simultaneously use two or more unrelated programs simultaneously in multiple views ("windows"), which allows the user to use multiple tools, an inventory/usage tool in one window and a license agreement tool in another window. The user would be able to relate the information in one tool to the information in the other visually, and, perhaps even to cut information from one and copy it into the other. However, no tool allows the user to correlate the metrics of a license agreement with the actual (or proposed) operation of the software itself. Users would benefit if they were able to conveniently answer questions such as the following:

For each product found in inventory which agreement governs its use?

For all products found in inventory
which products have an agreement associated with them?
which products have no agreement associated with them?

For all products meeting user-specified criteria (e.g., found on a particular processor, from a particular vendor, etc.), which agreements govern their use?

For all products with usage above or below a user-specified level over a user-specified time (e.g., unused for the past year) and meeting user-specified criteria (e.g., found on a particular processor, from a particular vendor, etc.), what agreements govern their use?

For all products whose maintenance contracts are within a user-specified time of cancellation or renewal and meeting user-specified criteria (e.g., found on a particular processor, from a particular vendor, etc.), what are the recent and current usage levels?

For each product for which the user has an agreement and meeting user-specified criteria (e.g., found on a particular processor, from a particular vendor, etc.), on which processors is the product installed and what are the recent and current usage levels?

For all products for which the user has an agreement and meeting user-specified criteria (e.g., from a particular vendor, etc.), which products have not been found in inventory?

For each product having a license agreement specifying a maximum number of MIPS (millions of instructions per second, a measurement of relative processing power) and meeting user-specified criteria (e.g., found on a particular processor, from a particular vendor, etc.), what is the total MIPS of the processors for which the product is installed? As used herein, MIPS is an inclusive term which also refers to MSU (million service units, CPU speed, drystone, whetstone, or any other measure of computing power.)

For each product for which the user has an agreement that specifies a particular number of processors and meeting user-specified criteria (e.g., from a particular vendor, etc.):

What is the number of processors on which it is installed, and is that number higher or lower than the agreement authorizes?

What is the number of processors on which it has been used during a user-specified period of time, and is that number higher or lower than the agreement authorizes?

For each product for which the user has an agreement that specifies that the product can be installed on one or more particular processors and meeting user-specified criteria (e.g., from a particular vendor, etc.):

On what processors is the product installed, and is any such use not authorized by the agreement?

On what processors has the product been used during a user-specified period of time, and is any such use not authorized by the agreement?

Likewise, the user would be able to be selective in his queries by optionally selecting processors, specified locations, and/or within user-specified organizational subdivisions to narrow the desired results.

SUMMARY OF THE PRESENT INVENTION

The present invention is designed to make it easy to answer the above and other such questions, and to overcome the problems inherent in not having the information pertaining to hardware and software product inventory and usage (on the one hand) and agreement information (on the other hand) coordinated.

The present invention is a software program and/or a knowledge base, hereinafter, the "tool," that enables the user to view information on the one hand pertaining to hardware and software product inventory and usage, and, on the other hand, license agreement information in such a way that the two sets of information are correlated and associated. The tool presents inventory and usage information based on agreement criteria and/or agreement information based on inventory and usage criteria in an integrated fashion that permits the user to switch from one kind of information to the other kind in a variety of convenient ways. The key components of the tool are the main software blocks which carry out the following main functional tasks: Data acquisition; Reconciliation and association; and Processing, display, and output.

As described above, the invention focuses and is exclusively directed toward being able to "view" license agreement information directly juxtaposed to software product inventory or usage data. Also, it is clear from the foregoing that "license agreement information or data" describes textual information—not executable software as such. In other words, the "license agreement data" exists separate and apart from any license management software that controls the "execution" of or access to license software. That is, the "license agreement data or information" is data that does not control the software execution. The "agreement data" being correlated has to include this non-software-execution related data.

As used herein, the term computer or computers—used by itself—means all types of computers from single to multiple PCs to midrange computers, UNIX, mainframe, networked, etc.

Other features and advantages of the present invention will become apparent from the following description of the invention which refers to the accompanying drawings.

DETAILED DESCRIPTION OF THE INVENTION

Introduction

The present invention is a software program, hereinafter, the "tool," that enables the user to view information on the one hand pertaining to hardware and software product inventory and usage, and, on the other hand, license agreement information in such a way that the two sets of information are correlated and associated. The tool presents inventory and usage information based on agreement criteria and/or agreement information based on inventory and usage criteria in an integrated fashion that permits the user to switch from one kind of information to the other kind in a variety of convenient ways.

The tool can be understood in terms of its major functional areas:

Data Acquisition
Reconciliation and Association
Processing, Display, and Output.

In the present invention, two or more sets of data (inventory/usage and agreement information) must be made known to the tool. There are several ways that this can be done, such as:

The tool can itself provide the functionality already described to obtain hardware, software inventory and/or usage information.

The information can be imported from one or more other products that provide that functionality (via reading a file or a database).

The tool can share a database with one or more products that already provide that functionality.

The tool can provide a facility by which the user can manually enter the information. (This is particularly applicable to the agreement information, as well as such information as the number of MIPS of each processor or processor subdivision.)

The tool can make use of APIs (Application Program Interfaces) provided by other products to obtain agreement information or inventory and usage information from the databases or data files of those other products.

The tool can provide APIs for other products to use to supply agreement information or inventory and usage information to the present program whenever such information is created or obtained by those other products.

Figure 1:
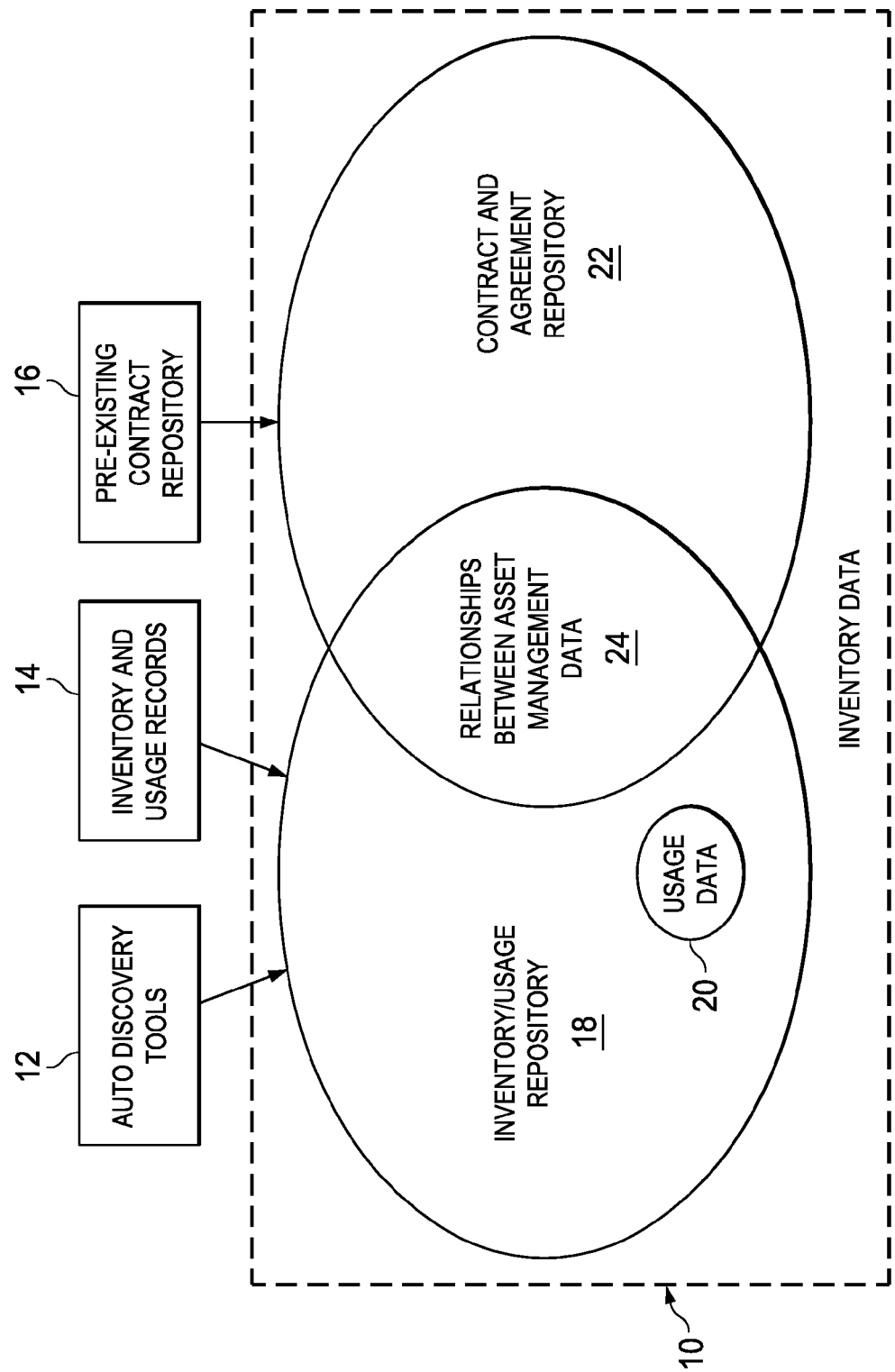
FIG. 1 illustrates a relationship between agreements, inventory and usage data.

With reference to FIG. 1, the present invention may interface with and/or acquire the bulk of its data from existing software inventory/usage and contract/agreement collectors as well as from data entered manually by operators. In one aspect thereof, the invention comprises a specially constructed database 10 which produces relationships between diverse pieces of asset management data. The database 10 contains information including inventory data 18 and usage data 20. This inventory and usage data can be obtained from auto discovery tools 12 and inventory and usage records 14, as shown. The database 10 further contains a contract and agreement repository 22, the information for which can be obtained from a pre-existing contract repository 16. The aim of the invention is to create data sets defining relationships between asset management data, such as between inventory data and contract and agreement data, as shown by the overlapped region 24 in FIG. 1, which represents data in the different data sets that are interrelated.

The size of the relationships data 24 relative to the size and content of the inventory data/usage data 18 or to the contract and agreement data 22 is dependent on the ability of the software to identify those relationships, as well as on the existence, in the first instance, of such relationships. For example, at some installations much of the inventory data may describe home-grown software products which are not covered by contract and agreement data. The usefulness of the present invention becomes more pronounced as the overlap region 24 increases in size and is quite significant when the linked data records in the region 24 constitute at least 25% of the number of records in either of the databases 18 or 20.

With further reference to the drawings, each set of data can be considered a repository of such data that is, presumably, created, modified and updated by processes external to the present invention. These repositories, while conceptually distinct, may be stored in separate databases or a single database.

The contract/agreement repository (CDB) 22 is a database of contractual information organized according to a unique agreement identification code (ID), and further according to the type of data it contains, e.g., the asset, asset group, invoice, purchase order and contract. Asset is defined to include but not be limited to hardware, software products, maintenance and service agreements. An asset group is a user-selected set of assets.

Each record or group of records contained in the CDB provides details of an agreement (lease, contract, license, etc.). Typically, such records include the following information:

Time and date of transaction
Vendor
Name, address, phone number, email address, etc. of vendor
General description of the asset (computer, DASD, software, maintenance, etc.)
Manufacturer, model, year, options, etc.
Warranties or support purchased
Contract terms and conditions (purchase, lease, rental, etc.)
Contact information (support personnel, phone numbers, email addresses, etc.)

These fields may also include more detailed information such as: licensing fees; number of persons authorized, MIPS authorized, number of invocations authorized, annual maintenance fees, and product/sub-product identifications.

The primary purpose of the CBD is to maintain a complete database of contract information. If a data element is not already supported by the CDB, the present invention will, optionally, create and maintain the data for that element. For example, if one vendor's CDB does not support asset groups, the present invention will provide the user with the capability of defining and maintaining asset groups.

In addition to electronic storage of the contract information, the present invention also provides the user with one or more ways to further store and/or reference an agreement:

1. An image of the original document is stored and/or referenced (i.e., file location, hyperlink, etc.). The image may have originated from a facsimile, optical scanner, digital photo, or image file generated by the user and/or vendor. Storage formats may be bitmap, JPEG, TIFF, or other known storage format.
2. Optical character recognition (OCR) techniques may be applied to a scanned document and the resulting data stored.
3. Electronic copy of the document. For example, a word processing file, spreadsheet, XML file, etc.
4. A description of the physical location of the original hardcopy document.

Figure 2:
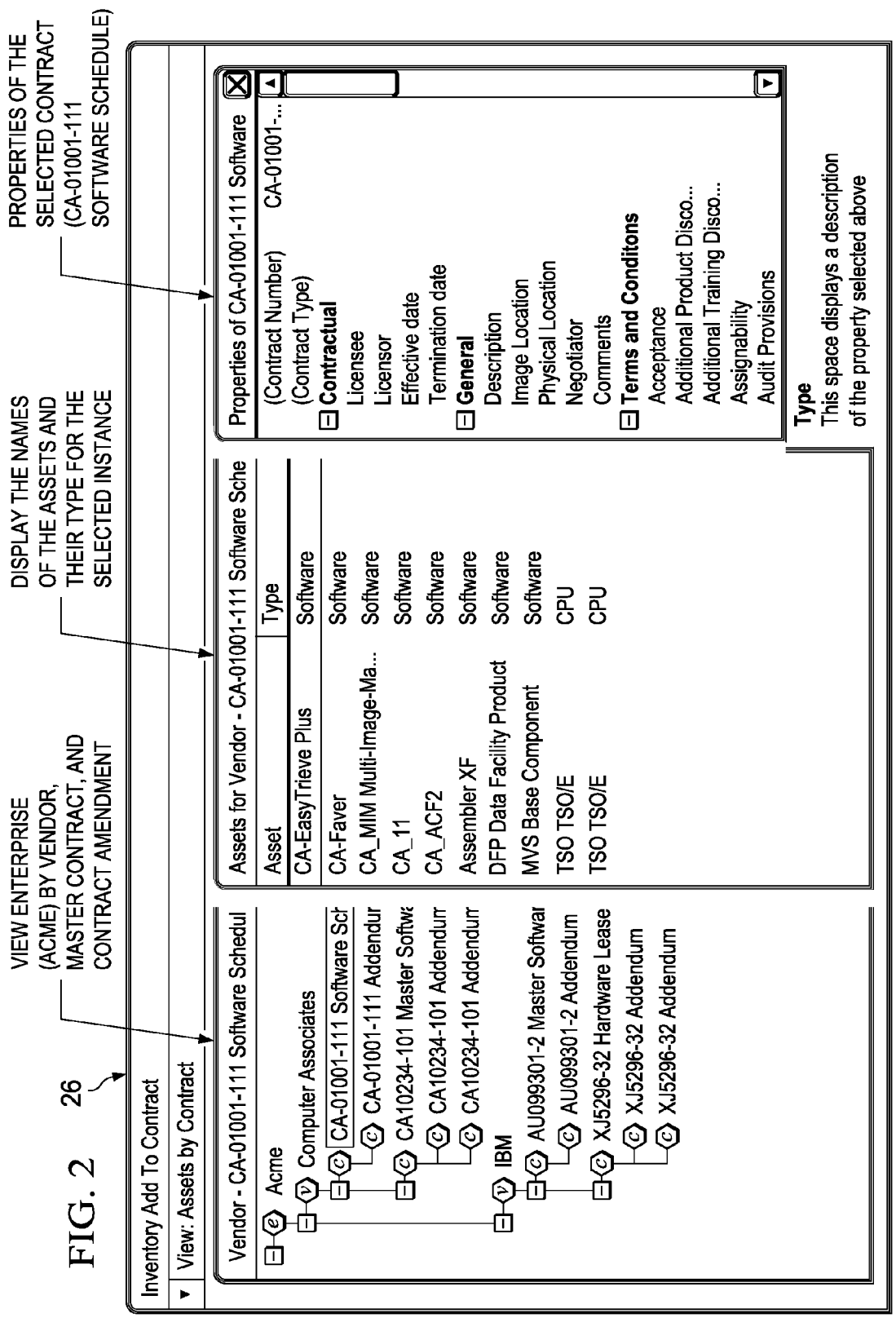
FIG. 2 is a software screen illustrating assets by contract comparisons.

FIG. 2 is a software screen 26 providing an example of asset information viewed by contract.

Reconciliation and Association

After the two types of information have been acquired, the next crucial step is the means to associate the two.

Product identification based on inventory is often presented in different terms than the identification based on agreements. For example, product or vendor names may not be identical; what is considered a single product from one point of view may be considered to consist of two or more products from the other; there may be other discrepancies and mismatches; etc.

Furthermore, even after all such inconsistencies, discrepancies, and mismatches have been resolved, there may be products for which there is license agreement information but no inventory information (e.g., the product has not yet been installed; it has been removed; or the licensing information is in error). Similarly, there may be inventory information but no license agreement information (e.g., the user doesn't have an agreement for the product; the product doesn't require an agreement; or the information is missing). Such products and agreements need to be identified, the reasons for such discrepancies need to be resolved, and the appropriate records must be created or deleted.

The present invention includes facilities by which all these tasks can be accomplished in a straightforward, substantially automated manner. By substantial automation is meant a process which reduces the time to produce data correlation/reconciliation to below about one fifth and preferably one tenth the time that the task would consume if it were carried out manually. The following list is meant to be illustrative and not exhaustive. Some of these facilities can be considered optional.

A facility for concurrently presenting two or more lists of items (e.g., products, vendors, processors, users, etc.) sorted by product name, product identification number, vendor name, vendor identification, or other identifying feature in a display.

Optionally, a facility by which the tool automatically establishes an association between items in one list (e.g., products, vendors, processors, users, etc.) with items in another list of such items whenever product name or product identification number match. These would be subject to user confirmation either globally or item-by-item.

Optionally, a facility by which the tool determines possible associations or associations that are most probable. This would be based upon the heuristics of evaluating the similarity of item name, identification number, or other such criteria between items in one list and items in another list. [Techniques that could be applied include: Soundex coding, pattern matching, dictionary lookup, and/or Fuzzy Logic.] The results would be displayed for user selection, confirmation, or rejection. For each item to be associated, the facility provides as many candidates as are appropriate, ranked alphabetically or in likelihood of match. All such candidate associations can be displayed in a distinctive color; the user could tab or scroll directly from one such candidate association to the next and confirm or reject each one in turn, or could highlight and accept or reject several such candidate associations at once A facility by which the user specifies an association between one or more items in one list with an item in another list. The user might use a pointing device such as a computer mouse to highlight one or more items on the one list of products and one item on the other list of products. Optionally, the tool would present an opportunity for the user to confirm the association before it was processed.

A facility for making changes to the associations already established. There are several ways in which these associations can be implemented.

One method is for each record in a table to be linked with a corresponding record in another table. Into that field, for each record, is written the index (pointer) of the corresponding record (that is, the record to be linked to) in the other table. This can be done reciprocally, so that each table has a field that points to records in the other table, as illustrated below:

| LICENSE AGREEMENT PRODUCTS TABLE | | | | |
| --- | --- | --- | --- | --- |
| Record Number | Product Name | Vendor Name | Effective Date | Inventory/Usage Record Number |
| 0000001 | OS/390 | IBM | May 04, 1989 | 0000079 |
| 0000002 | CICS | IBM | May 04, 1989 | 0000063 |
| 0000003 | ABEND-AID | CA | Jan. 01, 1993 | 0000042 |
| . . . . . . (etc.) | | | | |

| INVENTORY/USAGE PRODUCTS TABLE | | | |
| --- | --- | --- | --- |
| Record Number | Product Name | Vendor Name | License Agreement Record Number |
| . . . 0000042 | CA-ABEND Aid | Computer Associates Int'l. | 0000003 |
| . . . 0000063 | Cust. Info. Control Sys. | International Business Machines Corporation | 0000002 |
| . . . 0000079 | MVS | International Business Machines Corporation | 0000001 |
| . . . (etc.) | | | |

NOTE: These tables are meant only to be illustrative. In actual implementation, these tables would contain many other fields (columns) than shown here, and the actual structure and contents of the tables would be quite different. For example, in a preferred implementation, there would be a separate vendor table; in a products table, a record would contain only an index pointer into the vendor table.

In one implementation using this approach, a user looking at a license agreement or list of license agreements may also want to look at the inventory/usage information pertaining to a given product. The tool would only have to read the corresponding record number from the license agreement table to have an index pointer into the inventory/usage table.

In another preferred method, a separate table is created consisting of links associating records in a license information table with corresponding records in a usage information table. Each record of the table consists of two indices, one into one table and one into the other.

Figure 5:
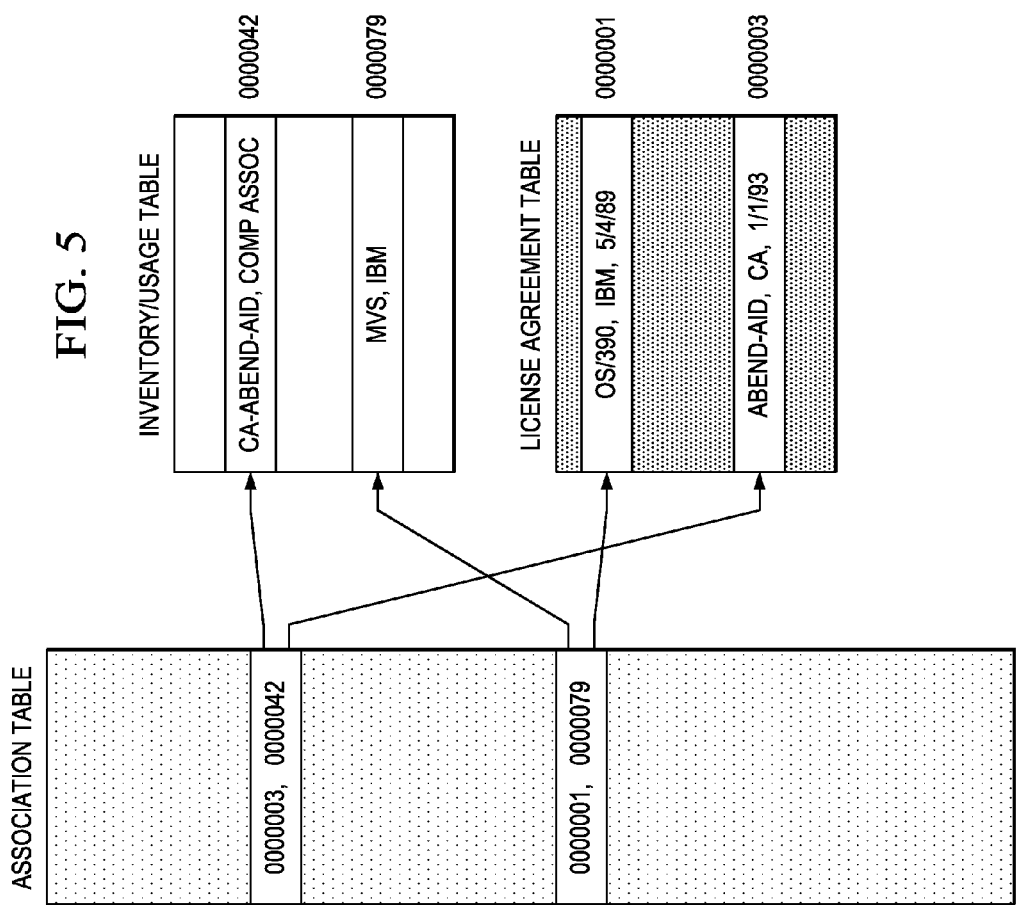
FIG. 5 illustrates a table of associations.

FIG. 5 demonstrates how this association table is applied. One can see that this method provides the additional advantages that it is can be created and maintained without the need to alter either the Inventory/Usage table or the License Agreement table and permits many-to-many associations.

The inventory/usage repository of an organization's assets (ADB) 18 may contain information which duplicates or closely resembles that contained within the CDB 22. In addition to matching assets in the ADB with those in the CDB, the present invention reconciles such differences.

Although the CDB and the ADB are conceptually distinct, they can be stored in separate databases or a single database, and that any additional tables or lists that are created by the present invention can be part of that same database, one of the two separate databases, or a third separate database.

In a preferred embodiment, the present invention provides a facility, the List Associator (LA), for automatically establishing an association between items in the CDB, i.e., agreements, with items in the ADB (i.e., software products, vendors, processors, etc.) whenever product name, product identification number or other identifying feature match.

In a preferred method, a separate table is created consisting of links associating records in one database (e.g., the ADB) with corresponding records in another database (e.g., the CDB). An advantage of this method over importing the two types of information into a combined list is that as data contained within the individual repositories is dynamically updated, e.g., usage data or the movement of an asset to another physical location, the associations remain always linking the most current data together.

Figure 3:
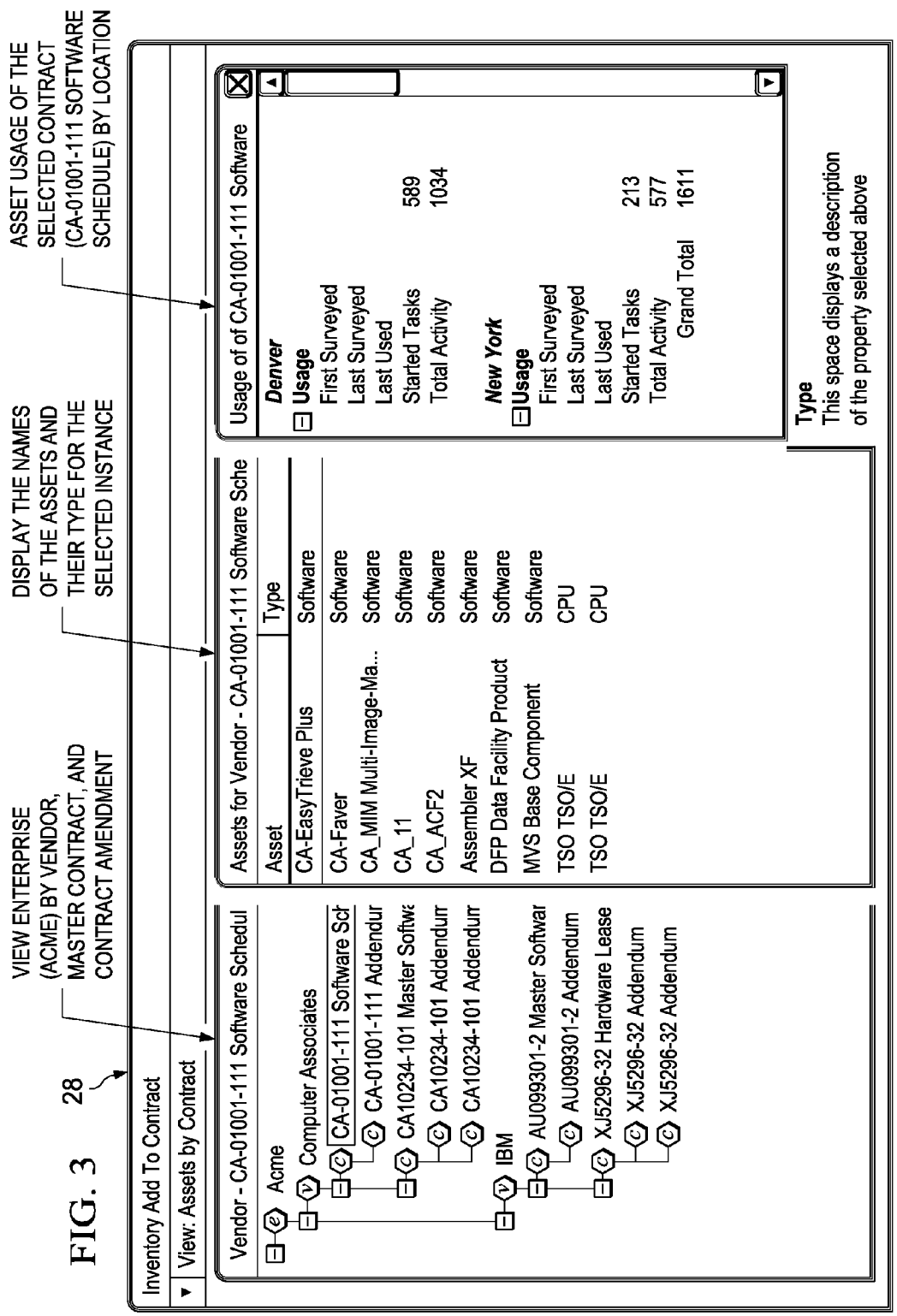
FIG. 3 is another software screen providing an asset usage by contract view.

FIG. 3 is a computer screen 28 that is an example of product usage viewed by the contractual agreement under which it was acquired.

For example, an agreement for the software product CA-ABEND Aid from Computer Associates Int'l exists in the CDB as record number 0000003, and the product is shown in record number 0000042 of the ADB to be installed on the Development System #2 of Acme Atlanta's Data Processing Center. The LA establishes an association (e.g., 00000030000042) between the two records, thus, if the product is moved to Development System #1, record 0000042 of the ADB is updated. However, since both CDB record 0000003 and association 00000030000042 remain unchanged the user is always presented with the most current information.

The LA creates associations that are many-to-many. Typically, an agreement may include several assets and, an asset may involve multiple agreements (e.g., one for purchase and a second for maintenance). An advantage of this method over importing the two types of information into a combined list is that data fields are not needlessly duplicated.

Optionally, the LA determines possible associations or associations that are most probable. This is based upon the heuristics of evaluating the similarity of item name, identification number, or other such criteria between items in one list and items in another list. Several techniques that can be applied separately or together include: Soundex coding, pattern matching, dictionary (or Knowledge Base) lookup, and/or Fuzzy Logic. The results may be displayed for user selection, confirmation, or rejection. For each item to be associated, the LA provides as many candidates as are appropriate, ranked alphabetically or in likelihood of match. All such candidate associations can be displayed in a distinctive color; the user could tab or scroll directly from one such candidate association to the next and confirm or reject each one in turn, or could highlight and accept or reject several such candidate associations at once.

Optionally, the user can provide a set of rules by which the LA can establish an association between records in separate lists. For example, a rule can be established to treat XYZ Corporation and XYZ International (a wholly-owned subsidiary) as one and the same.

Optionally, the LA provides a facility by which the user specifies an association between one or more items in one list with an item in another list. The user might use a pointing device such as a computer mouse to highlight one or more items on the one list of products and one item on the other list of products. Optionally, the LA would present an opportunity for the user to confirm the association before it was processed.

Dynamic Detection of Change:

Over the course of time, and for a variety of reasons, associations made by the LA may refer to records that have been deleted and, perhaps, reused for other agreements or assets. Associations for new agreements or assets also need to be made. The user may execute the LA to update these associations and/or this may be scheduled to occur on a periodic basis. However, as a typical installation may have hundreds if not thousands of assets and agreements, this may prove time-consuming and an inconvenience.

Each of the programs that control the ADB and CDB can be modified to notify the LA to update its associations when records are added, deleted, copied or substantially changed (e.g., an asset is disposed of). A disadvantage of this method is that the vendors of these programs may not provide such support.

As an independent notion from the techniques described above, a Dynamic Detection process could directly detect the act of adding, deleting, copying or substantially modifying one or more records in either or both of the ADB and CDB. The Dynamic Detector (DD) is a continuously running process that establishes certain intercepts or hooks into certain operating system or database functions so that when any records in these databases are added, deleted or modified, in any of the several ways in which this could occur, the DD receives control, and is able to analyze the operation. When the DD determines that a record has been added or modified, it may notify the LA to update or create new associations for those records. If a record has been deleted the LA may decide to perform a more extensive analysis.

Remote Access

The present invention provides various types of remote access capabilities and for a variety of purposes.

A user may provide read-only access to a third party that will use agreement and usage information to negotiate contractual terms with a vendor on behalf of the user.

A user may import information from other sites within the enterprise to view financial and usage data for the purpose of identifying and eliminating unfavorable scenarios (e.g., high-cost contracts with little or no usage), evaluating purchasing and maintenance strategies as well as identifying various cost centers. Similarly, a user may outsource various processing tasks on a sporadic or routine basis and desire to be able to import this usage information.

A user may export information to a service organization that gathers such information from numerous organizations in order to determine industry-wide cost and usage statistics. The user may then evaluate the resulting data in order to determine pricing, purchasing and maintenance strategies.

A user may employ a service bureau to operate the present invention.

In either case, techniques for accessing the appropriate record or records in the one table from a record in the other table are known to those skilled in the art of writing software that accesses data in a database.

Once these associations are recorded in the database (and the appropriate software is available to make use of these associations, as discussed below), it becomes readily possible for the user to access information automatically and conveniently, as described in more detail in the next section.

Processing, Display, and Output

Initial processing consists of reconciliation and association of the licensing and inventory/usage records as described in the preceding section. Afterwards, the tool provides a number of facilities to process this information for display and output.

These would, among other things, automatically display a list of similar products, while providing the user: the ability to scroll or tab through the complete list to the next such product; an ability to print a list of such products; and the ability to output a flat file with one record for each such product. Information displayed may include:

agreements for which no inventory information has been associated, as well as a facility for creating a corresponding record in the list of inventoried products, suitably flagged.

inventoried products for which no agreement information has been associated, as well as a facility for creating a corresponding record in the list of products, suitably flagged, for the agreement portion of the tool.

products for which both inventory and agreement information is present.

When an item or list of items providing inventory and/or usage information about a product is on display, the user, via a function key, special keystroke combination, or mouse operation, can invoke a display of the corresponding (associated):

agreement information record or records.

usage and/or inventory information record or records.

Where license agreement information is pertinent to inventory and usage information, the tool will optionally calculate and distinctively display such information.

For example, if a license agreement specifies that a product must only be installed on a particular computer, the tool highlights (e.g., in blue) inventory records indicating the product is installed on the authorized computer and highlights (e.g., in red) inventory records indicating the product is installed on an unauthorized computer.

As another example, if a particular agreement licenses a particular product to be installed on computers totaling no more than a certain number of MIPS, the tool totals the MIPS of the processors on which that product has been found (according to the inventory information). If the calculated total is under the licensed capacity, the license is displayed in one way (e.g., in blue), and if the authorized capacity is exceed, in another way (e.g., in red).

Optionally, the user can select parameters and criteria (such as products on selected processors, at specified locations, within specified organizational subdivisions, from specified vendors, having usage above or below specified levels over a specified period of time, used by specified users, etc.) whereupon the tool will:

Distinctively display inventory and usage information according to whether or not user-specified agreement-related criteria are met, such as products on selected processors, at specified locations, within specified organizational subdivisions, from specified vendors, having usage above or below specified levels over a specified period of time, used by specified users, etc. For example, the user can request that the inventory and usage information pertaining to all programs whose maintenance terms are within one month of expiration (according to the corresponding agreement information) be distinctively displayed (e.g., in red), or the display can be filtered to include or exclude all such information.

Display, for each product (or set of products) found in inventory the relevant license agreement or agreements.

Display, for each user-selected set of products found in inventory the vendors and/or distributors associated with the agreement or agreements, as well as pertinent information about the vendors and/or distributors, such as their Internet Web site addresses (optionally, with the facility to open a browser Window displaying information from the appropriate Web site). While the user can choose to select a subset of all products, he or she can choose to include all products.

Display, for each user-selected set of products found in inventory contact information (such as name, address, telephone numbers, email addresses) pertaining to the agreement or agreements.

Display, for each user-selected set of products found in inventory important dates associated with the agreement or agreements (such as cancellation and renewal dates).

Display, for each user-selected set of products found in inventory invoice and/or payment forecast, budget, and/or history information.

Display, for all user-selected set of products found in inventory the products that either do or do not have an agreement associated with them.

Display for all agreements, all products that have not been found in inventory.

Display, for all products whose maintenance contracts are within a user-specified time of cancellation or renewal, the recent and current usage levels.

Display for each agreement on which processors, if any, the product is installed and how much it has been used. Included in the display of usage information is which users, on which processors, at what locations, by what organizational subdivisions, when it was used (by date, by hours of use, days of the week of use, etc.), etc. Optionally, all such information can be displayed for each version and/or release of the product identified.

Display for each agreement, usage trends and projections, including by costs incurred over specified time periods.

Display for each agreement that specifies a maximum number of MIPS (a measuring of relative processing power), the processors on which the product is installed.

Display for each agreement that specifies a particular number of processors the number of processors on which it is installed, and whether that number is higher or lower than the agreement authorizes.

Display for each agreement that specifies a particular number of processors the number of processors on which it has been used during a user-specified period of time, and whether that number is higher or lower than the agreement authorizes.

Display for each agreement that specifies that the product can be installed on one or more particular processors, the processors is the product installed, and whether any such use is not authorized by the agreement.

Display for each agreement that specifies that the product can be installed on one or more particular processors for which the user has an agreement, the processors on which the product has been used during a user-specified period of time, and whether any such use is not authorized by the agreement.

Display, for each agreement that authorizes particular (or multiple) versions and/or releases of the product the versions and/or releases installed, indicating any of these are not authorized by the agreement.

Display charts and graphs of any or all of the user-selected and user-specified information selected for display, with records meeting specified criteria distinctively highlighted.

Information presented to the user via interactive display can also be used to

Produce printed reports of user-selected and user-specified information, distinctively highlighting records that meet the specified criteria.

Export records for use by other programs and products of user-selected and user-specified information.

Furthermore, the invention can, among other things:

Display, for each user-selected set of products found in inventory invoice and/or payment forecast, budget, and/or history information.

Display for each agreement on which processors, if any, the product is installed and how much it has been used. Included in the display of usage information is which users, on which processors, at what locations, by what organizational subdivisions, when it was used (by date, by hours of use days of the week of use, etc.), etc. Optionally, all such information can be displayed for each version and/or release of the product identified.

Display for each agreement, usage trends and projections.

Since costing information is included in the License Agreement Table, further aspects relating to cost are possible with this invention. Such features include:

Display, for all products whose maintenance contracts are within a user-specified time of cancellation or renewal, the anticipated costs based upon recent and current usage levels.

Display for each agreement on which processors, if any, the product is installed and the actual licensing costs based upon how much it has been used over selected time periods, e.g. prior three, or six etc. months. Included in the display of this information is which users, on which processors, at what locations, by what organizational subdivisions, when it was used (by date, by hours of use, days of the weeks of use, etc.), etc. Optionally, all such information can be displayed for each version and/or release of the product identified.

Display for each agreement, licensing cost trends and projections.

Figure 6:
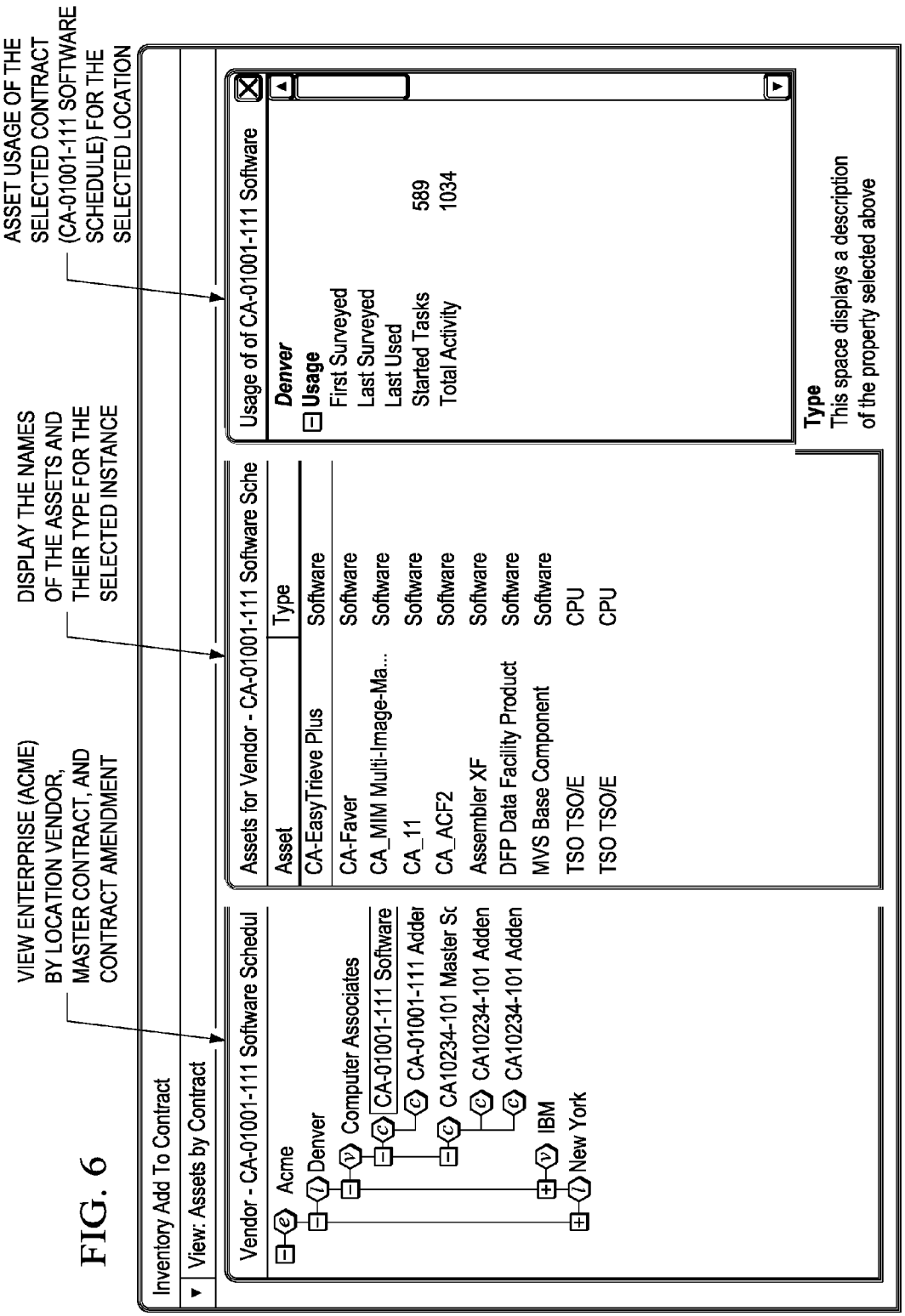
FIG. 6 is another software screen illustrating asset usage by contract and location.

Certain output aspects of the present invention are illustrated in FIG. 6 which shows the usage of selected software assets organized according to agreement and location.

When a software tool, e.g. the data acquisition tool, is said to be "independent," it is to be understood that the tool stands alone, operating independently of the other tools, for example, as when using the present assignee's SoftAudit® software to gather inventory and usage data. Relative to data bases, the term means that one data base can be modified without being concerned about the contents of other data bases, without destroying the usefulness or operability of the system of the present invention.

Figure 4:
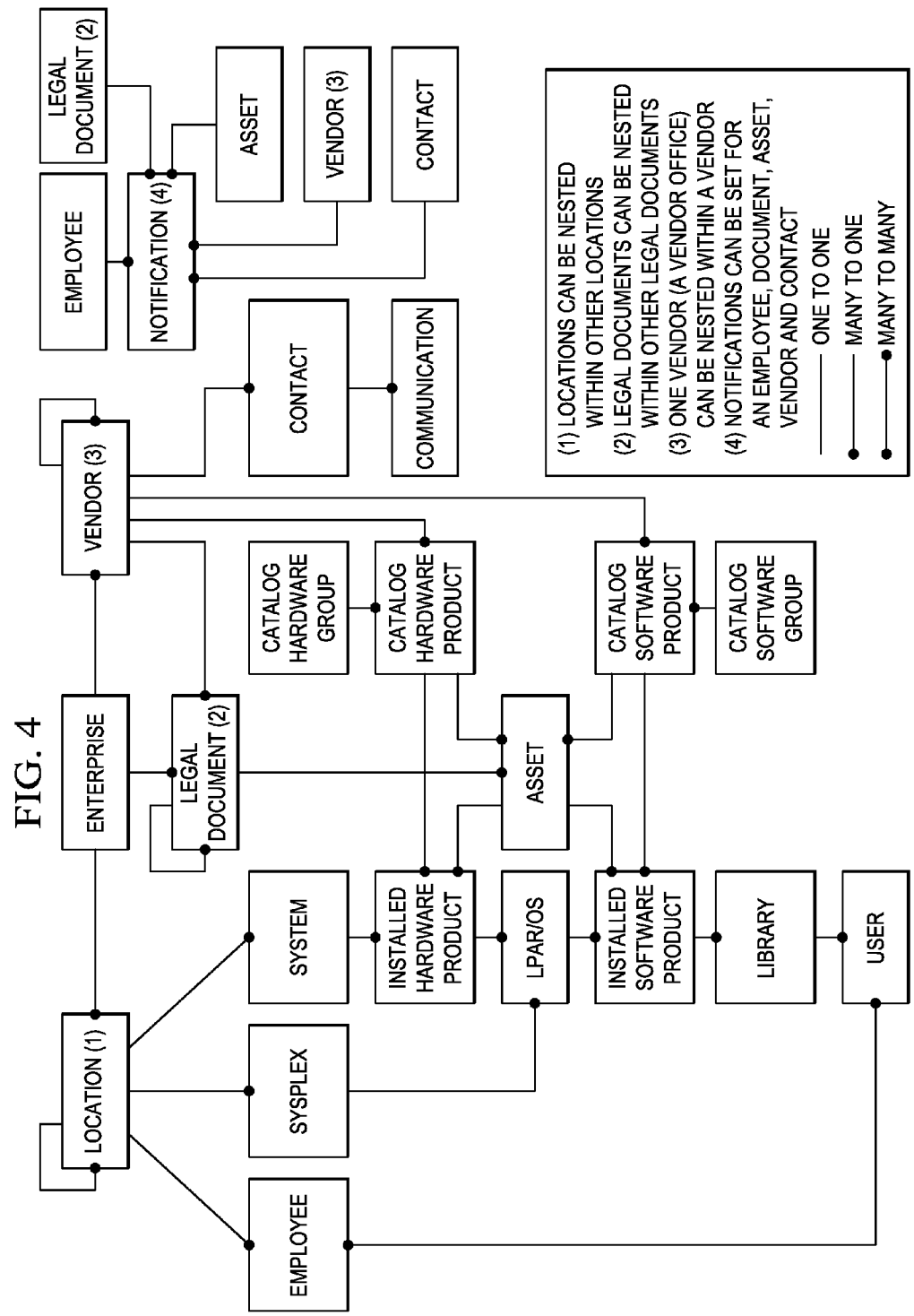
FIG. 4 is a conceptual data model of the present invention.

A conceptual data model of certain aspects of the present invention is illustrated in FIG. 4 which shows various correlations of information. In, the figure, a straight line denotes a one-to-one database relationship. A line that is dotted on both ends denotes a many-to-many relationship. A line that is only singly dotted denotes a many-to-one relationship.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method, in a data processing system, for correlating inventory and usage information with agreement information, the method comprising:

importing, by the data processing system, inventory and usage information from an asset database;

importing, by the data processing system, contract and agreement information from a contract and agreement database;

generating a links table, wherein the links table associates records in the asset database with records in the contract and agreement database;

establishing, by a list associator in the data processing system, associations, each association being between one or more items in the asset database and one or more items in the contract and agreement database; and displaying product information based on the inventory and usage information, the contract and agreement information, and the associations.

2. The method of claim 1, wherein establishing associations comprises:

automatically establishing an association between one or more items in the asset database and one or more items in the contract and agreement database responsive to a product name or product identification number matching;

displaying the association between the one or more items in the asset database and the one or more items in the contract and agreement database; and receiving confirmation from a user that the association between the one or more items in the asset database and the one or more items in the contract and agreement database is accepted.

3. The method of claim 1, wherein establishing associations comprises:

identifying an association that is probable based on a heuristic of evaluating similarity of item name, identification number, or other criteria between one or more items in the asset database and one or more items in the contract and agreement database;

displaying the association between the one or more items in the asset database and the one or more items in the contract and agreement database; and receiving confirmation from a user that the association between the one or more items in the asset database and the one or more items in the contract and agreement database is accepted.

4. The method of claim 3, wherein the heuristic comprises soundex coding, pattern matching, dictionary lookup, or fuzzy logic.

5. The method of claim 1, wherein establishing associations comprises:
receiving selection from a user of one or more items in the asset database and one or more items in the contract and agreement database; and
establishing an association between the selected one or more items in the asset database and the selected one or more items in the contract and agreement database.

6. The method of claim 1, further comprising:
responsive to dynamically detecting modification of one or more records in the asset database or the contract and agreement database, updating one or more associations in the links table.

7. The method of claim 1, wherein displaying product information comprises displaying agreements for which no inventory information has been associated.

8. The method of claim 7, further comprising:
creating a corresponding record in the asset database; and flagging the record.

9. The method of claim 1, wherein displaying product information comprises displaying inventoried products for which no agreement information has been associated.

10. The method of claim 9, further comprising:
creating a corresponding record in the asset database; and flagging the record.

11. The method of claim 1, wherein displaying product information comprises displaying products for which both inventory and agreement information are present.

12. The method of claim 1, wherein displaying product information comprises:
displaying a list of items providing inventory and usage information about a product installed on a particular computer;
responsive to a user selecting an item and invoking a display of corresponding information, displaying one or more agreement information records and one or more usage information records corresponding to the selected item.

13. The method of claim 12, wherein displaying one or more agreement information records and one or more usage information records corresponding to the selected item comprises:
responsive to a determination that use of the product is authorized for use on the particular computer, highlighting display of the one or more agreement information records or one or more usage information records corresponding to the selected item to indicate that usage is authorized by one or more agreement.

14. The method of claim 12, wherein displaying one or more agreement information records and one or more usage information records corresponding to the selected item comprises:
responsive to a determination that use of the product is not authorized for use on the particular computer, highlighting display of the one or more agreement information records or one or more usage information records corresponding to the selected item to indicate that usage is not authorized by one or more agreement.

15. The method of claim 1, wherein displaying product information comprises displaying inventory and usage information according to whether or not user-specified agreement related criteria are met.

16. The method of claim 1, wherein displaying product information comprises displaying, for each product found in the inventory and usage information, one or more relevant license agreements.

17. The method of claim 1, wherein displaying product information comprises displaying, for each user-selected set of products found in the inventory and usage information, at least one of vendor or distributor information, contact information, important dates, invoice or payment forecast information, budget information, or history information associated with one or more relevant license agreements.

18. The method of claim 1, wherein displaying product information comprises displaying, for each user-selected set of products found in the inventory and usage information, usage information for the product.

19. The method of claim 1, wherein displaying product information comprises displaying, for each agreement, usage information for one or more products associated with the agreement.

20. The method of claim 19, wherein the usage information comprise at least one of usage trends and projections, a number of processors on which the one or more products have been used, particular processors on which the one or more products have been used, or versions or releases installed.

21. A computer program product comprising a non-transitory computer readable medium having a computer readable program stored therein, wherein the computer readable program, when executed on a computing device, causes the computing device to:
import inventory and usage information from an asset database;
import contract and agreement information from a contract and agreement database;
generate a links table, wherein the links table associates records in the asset database with records in the contract and agreement database;
establish associations, each association being between one or more items in the asset database and one or more items in the contract and agreement database; and
display product information based on the inventory and usage information, the contract and agreement information, and the associations.

22. An apparatus, comprising:
a processor; and
a memory coupled to the processor, wherein the memory comprises instructions which, when executed by the processor, cause the processor to:
import inventory and usage information from an asset database;
import contract and agreement information from a contract and agreement database;
generate a links table, wherein the links table associates records in the asset database with records in the contract and agreement database;
establish associations, each association being between one or more items in the asset database and one or more items in the contract and agreement database; and
display product information based on the inventory and usage information, the contract and agreement information, and the associations.

* * * * *